United States Patent [19]

Krein et al.

[11] Patent Number: 5,748,917
[45] Date of Patent: May 5, 1998

[54] LINE DATA ARCHITECTURE AND BUS INTERFACE CIRCUITS AND METHODS FOR DUAL-EDGE CLOCKING OF DATA TO BUS-LINKED LIMITED CAPACITY DEVICES

[75] Inventors: William Todd Krein, San Jose; Charles M. Flaig, Cupertino; James D. Kelly, Aptos, all of Calif.

[73] Assignee: Apple Computer, Inc., Cupertino, Calif.

[21] Appl. No.: 579,884

[22] Filed: Dec. 28, 1995

Related U.S. Application Data

[63] Continuation of Ser. No. 215,281, Mar. 18, 1994, abandoned.

[51] Int. Cl.[6] .................................................. G06F 13/38
[52] U.S. Cl. ................... 395/306; 395/555; 395/800.01; 395/898
[58] Field of Search ........................... 395/800, 200.08, 395/306, 800.01, 898, 555; 370/85.6; 307/289, 272.1, 279, 465; 364/DIG. 1

[56] References Cited

U.S. PATENT DOCUMENTS

| | | | |
|---|---|---|---|
| 4,629,909 | 12/1986 | Cameron | 307/279 |
| 4,979,190 | 12/1990 | Sager et al. | 375/106 |
| 4,980,577 | 12/1990 | Baxter | 307/272.1 |
| 5,050,162 | 9/1991 | Golestani | 370/60 |
| 5,122,978 | 6/1992 | Merrill | 364/569 |
| 5,179,295 | 1/1993 | Mattison et al. | 307/289 |
| 5,250,858 | 10/1993 | Strong | 307/465 |
| 5,343,473 | 8/1994 | Cidon et al. | 370/85.6 |
| 5,594,877 | 1/1997 | Lentz et al. | 395/306 |
| 5,604,865 | 2/1997 | Lentz et al. | 395/200.08 |

*Primary Examiner*—Alyssa H. Bowler
*Assistant Examiner*—Walter D. Davis, Jr.
*Attorney, Agent, or Firm*—Fenwick & West LLP

[57] ABSTRACT

A data system architecture and interface circuits permit slow devices having limited signal capacities to launch and receive information from a central bus. Data is clocked onto the bus with a master circuit at the leading and trailing edges of the bus clock so that portions of a large multibit signal are launched without having to wait for the initiation of a next clock cycle. Accordingly, data portions are launched during both leading and trailing edges of the clock signal. In the case of a simple bus device not able to accommodate inclusion of a slave interface circuit, the received signal packet is provided in adapted form anticipating that only a second half portion of the signal packet will actually be registered as received.

3 Claims, 13 Drawing Sheets

LINE DATA ARCHITECTURE AND BUS INTERFACE CIRCUITS AND METHODS FOR DUAL-EDGE CLOCKING OF DATA TO BUS-LINKED LIMITED CAPACITY DEVICES

RELATED APPLICATIONS

This is a continuation of Prior Application Ser. No. 08/215,281 filed on Mar. 18, 1994, now abandoned.

CROSS-REFERENCE TO RELATED APPLICATIONS

This application is related to co-pending patent application filed on Jan. 25, 1994 and having the same inventorship as herein, and respectively entitled "Improved Bus Protocol Using Separate Clocks for Arbitration and Data Transfer." This co-pending patent application has respective Ser. No. 08/186,380. This patent application is assigned to the same assignee as herein, and is incorporated herein by reference in its entirety.

TECHNICAL FIELD

This invention relates to electronic signal communication between systems, components, and devices connected to a centrally controlled bus, and particularly to signal protocol and line/packet architecture and related circuitry for dual edge clocking of data communication packets through centrally controlled bus lines.

BACKGROUND OF THE INVENTION

In general, nodes connected to busses in centrally controlled bus systems are specified to accept minimum burst size data transfers at a predetermined maximum bus data rate at a fixed bit width. However, certain classes of nodes connected to such busses, for example those with an eight bit interface, including for example certain Ethernet nodes or nodes crafted in some laboratory entities, may not be able to have access to even simple interface arrays which may be offered in current state-of-the-art bus systems. Access on a particular bus to particular components connected to the bus can be centrally controlled. To avoid bus contention arising when a number of components attempt to access the same bus simultaneously, priority can be granted according to a selected arbitration scheme.

A typical packet of information transmitted in a bus system may include a header line and one or more data line of information. Busses for carrying such signals may, for example, be 32 bits wide. Each header and each data signal packet may on the other hand be 64 bits wide.

It may be desirable to enable devices with limited address space and low bandwidth characteristics to operate effectively in a bus system employing centralized decoding and dual-edge clocking for data transmission and reception. Also, it may be desirable to provide master and slave circuits for connection to bus systems as interfaces to enable the effective launching onto and capture from bus systems of data packets, data lines, and other quantities of information. Additionally, it may be desirable to adjust the signal protocol and data architecture within information and data lines and packets transmitted in a bus system to accommodate the anticipated bandwidth (i.e., bit width and clock speed) characteristics of devices, components, cards, and systems likely to be connected onto the Sp bus system.

SUMMARY OF THE INVENTION

The invention herein is directed toward methods and arrangements for enabling the whole or partial acceptance of information packets from a data bus in a slave mode, and for enabling the generation of information or data packets in a master mode which are capable of acceptance at a receiving node connected to the data bus. The information architecture of the data packets according to the invention is structured to accommodate the anticipated bandwidth of devices, cards, or systems on the data bus. In particular, the invention herein structures the internal architecture of header and data signal lines of a data packet to ensure that significant portions of the header and data lines are secured to ensure their being read at even simple nodes coupled to the data bus. Particularly significant information in a header line includes key functional information items such as the most significant address information, the actual data length in succeeding data lines following the header line, and indications as to the character of the information in the data lines as read, response, lock, error, and source identification information. As some receiving nodes are able to secure only the second half of a transmitted line of data, the preferred internal architecture of an information pack includes essential header information in the second half of the affected header and data lines. The data transmitted over a bus may be padded with filler information to ensure that the first half-period of every line is blank, as that actual data is only transmitted during the second half of each clock period. Thus, information transmitted on a bus during the first half period is likely to be lost and only transmissions during the second half period will be secured, according to the invention herein.

The invention is further directed toward a master data circuit effective for adapting a data packet for introduction into a reduced bandwidth data bus. The master data circuit includes, according to one version, a flip flop, a multiplexer, and a buffer, which is opened in response to a bus grant, or Go signal from a bus arbitrator or controller. One version of the present invention is directed toward a slave data circuit adapting an input of reduced bit width, for example, into wider or narrower bit widths. Data adaptation may be accomplished with an interfacing slave data circuit which for example includes a bus data buffer, a bus clock buffer, and first and second partially cascaded data latches, arranged in a slave data path from the data. The slave data circuit for example concatenates clocked two half cycle data portions into a single broadband data line. One half cycle is considered to be equal to a half period of the bus clock. Accordingly, a full period of the bus clock is two half cycles long. The first data latch is open during the first half cycle and closes at the falling edge of the clock signal controlling component operation, according to one version of the present invention, at which a second half cycle starts, effectively securing the first portion of the data packet information received. At the rising edge of the bus clock signal, according to one version of the present invention, the bits of the data bus comprising the second half cycle data are concatenated with the stored first half cycle data at the second data latch which also serves as a line register to form a full output line of data.

The present invention is further directed toward receiving circuitry or slave circuitry including a flip flop effective for providing a selected fraction of its input bytes per time interval to a FIFO register which, under control of a state machine, then produces the received information to a connected device or system, such as an Ethernet network. The connection from the receiving flip flop to the FIFO and the state machine is branched, and both the FIFO and the Ethernet network are operationally controlled by control signals from the state machine. Another version of the receiving circuitry or slave circuitry of the present invention includes a pair of receiving flip flops which provide, in the first case, a reduced bit width of data from the parallel input size of the received information. This reduced bit width data is sent to a multiplexer which then produces the received information in byte-sized portions to a connected device or system, such as an Ethernet network, and in the second case to a state machine effective for controlling the enablement of the respective flip flops and for controlling the production of output data from the multiplexer, the information to the second of the flip flops being address or header information required by the state machine to control the indicated operations.

A further version of the receiving or slave circuitry according to the present invention, includes a receiving flip flop directly connected to a device or system such as an Ethernet network. In particular, according to one embodiment, a predetermined amount of information in parallel form can be received from an input bus by the flip flop. The output connection from the flip flop is made to the Ethernet network and a state machine by a branched parallel bit line. The Ethernet network is subject to control by the state machine. According to another version of the receiving circuitry or slave circuitry of the present invention, the receiving flip flop is connected directly to both a multiplexer which then produces the received information to a connected device or system, such as an Ethernet network for example, and to a state machine effective for controlling the enablement of the flip flop, and controlling the production of output data from the multiplexer.

According to a further version of the present invention, a bus communication system is provided which enables the sending and receiving of information packets of predetermined bit widths. The information packets contain information which is organized in prioritized subpackets according to a predetermined prioritization scheme. The bus communication system includes sending and receiving components which are connected by a data bus of bit widths less than the information packets which are received by the bus communication system. The bus communication system includes a source of sequential clock signals. The information packets contain information in the packets which is positioned within the information packet to permit the composition into prioritized subpackets. The bus communication system further includes a common bus of bit width narrower than the bit width the information packets received by the bus communication system. The bus communication system includes sending and receiving circuits which are connected to the common bus. According to one version of the present invention a sending circuit includes a multiplexer circuit for decomposing information packets into prioritized sub packets including high and low priority and sub packets. The bus communication system further a storage circuitry, a receiving circuit for receiving at least high priority ones of the sub packets. According to the one version of the method of the present invention sequential clock signals are produced. Further, an information packet of predetermined bit width is received. Next, the information packet is decomposed into prioritized sub packets containing correspondingly prioritized information sets. Further, the collected ones of the prioritized sub packets are multiplexed and transmitted on a data bus of bit width less than the received information packet. Another version of the invention is directed toward a slave data circuit for connection and its input to a data bus for receiving information packets. The slave data circuit has a predetermined bus bit width for producing at its output information of a smaller bit width than received at its input. The received information packet is organized into information sets classified according to selected priority levels. In particular, the slave data circuit comprises a receiving flip flop circuit which includes a flip flop input and a flip flop output. The slave data circuit according to this version of the invention further includes a state machine for controlling receipt of data by an output device. The slave data circuit further includes a connection circuit for connecting the flip flop output to an output device.

BRIEF DESCRIPTION OF THE DRAWINGS

FIG. 5b shows a chart of the data portions actually captured by receiving devices shown in FIG. 5a;

FIG. 6 shows a chart of the data portions actually captured by receiving devices shown in FIG. 6a;

FIG. 7b shows a chart of the data portions captured by receiving devices shown in FIG. 8a;

FIG. 8b shows a chart of the data portions captured by receiving devices shown in FIG. 8a; and FIG. 9 shows a generalized flow chart of the basic operational process of the state machines employed in connection with the versions of the invention under FIGS. 5a, 6a, 7a, and 8a.

DETAILED DESCRIPTION OF THE PREFERRED EMBODIMENTS

Figure 1:
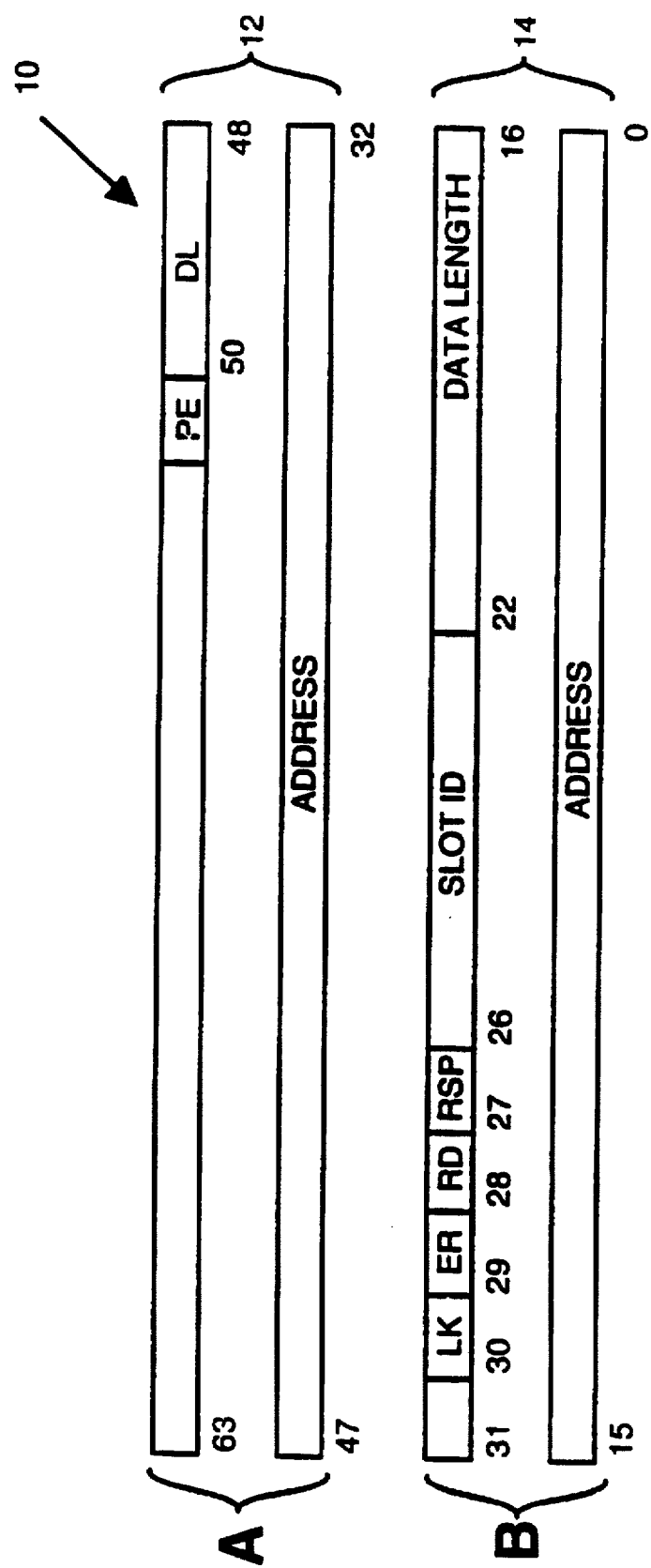
FIG. 1 shows an example of a typical header half cycle format according to one embodiment of the present invention for signal packets transferred to and from busses in a computer or communications system.

FIG. 1 shows an example of a typical header line format for data packets transferred to and from busses in a computer system. FIG. 1 particularly shows the architecture of a header signal packet 10 which is 64 bits long. The header signal packet 10 includes first and second portions, respectively 12 and 14, which are also referred to as portions A and B, for convenience. The first portion 12 of header signal packet 10 includes bits 63-32, and the second portion 14 of header signal packet 10 includes bits 31-0. Referring first to the composition of portion A of header signal packet 10, the beginning of this portion (as ranked by bit number), namely bits 47-32, is dedicated to containing address bits 31-16 labeled "ADDRESS." The information contained at this location of header signal packet 10 is in the field which contains the address affected by the transfer, i.e., the location read from or written to. The next part of this portion, namely bits 50-48, is dedicated to containing a DL field (for data length) to permit packet sizes of up to 1K bytes. Referring next to the composition of portion B of header signal packet 10, the beginning of this portion (as ranked by bit number), namely bits 15-0, is dedicated to containing address bits 15-0 labeled "ADDRESS." The next part of this portion, namely bits 22-16, is dedicated to containing a data length field to permit packet sizes of up to 128 bytes for example. This field is labeled "DATA LENGTH." In particular, the data length field indicates the byte length of the data section of the transfer for a write transfer or the number of requested bytes for a read transfer. The length is only that of used data bytes and does not include unused leading or trailing bytes. The next part of portion B, namely bits 26-23, is dedicated to a field containing the slot identification of the sourcing node (i.e., "SLOT ID"), which is required when returning an error packet or a response to a read request. The next bit, bit 27, contains an indication that the packet contains a read response, which is labeled "RSP." The following bit, bit 28, indicates that the packet contains a read request, or a read and set packet. This bit can alternatively indicate a write packet or a swap packet. Next bit 29 indicates notification of an error (i.e., "ER"), and bit 30 (i.e., "LK") indicates that a packet contains an atomic read and set or swap packet. The information in bits 31-0 is considered to be of greater significance and utility to receiving devices or systems than the information in bits 63-32. This prioritized packaging of the most significant information in portion B of signal packet 10 is an example of structured data packaging which enables operation in accordance with the present invention as will be discussed below.

Figure 2:
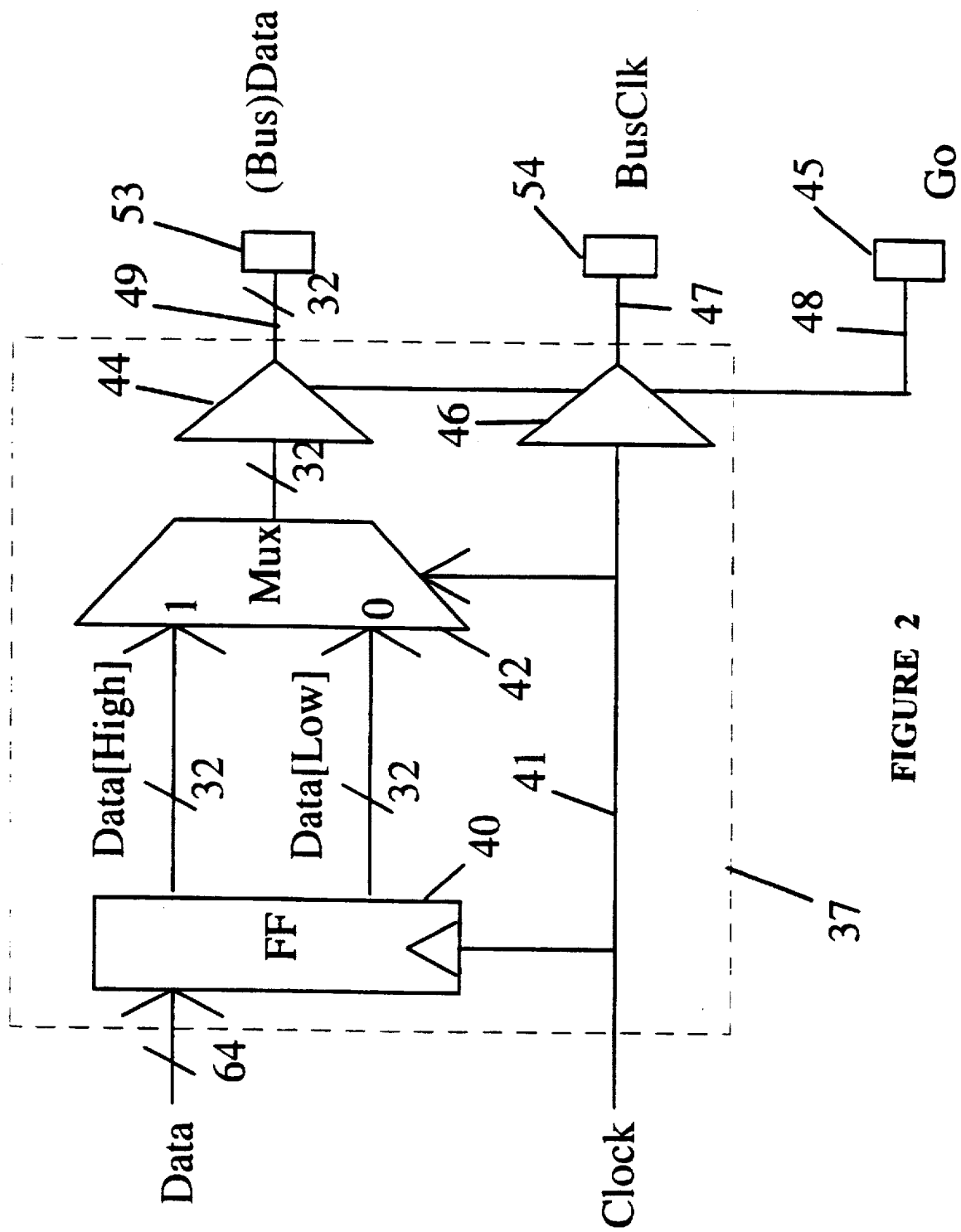
FIG. 2 shows a master data circuit diagram according to the present invention for adapting input information into a reduced byte sized data bus with circuit elements arranged in a master data path.

FIG. 2 shows a circuit diagram for a master data circuit 37 for adapting 8 bytes of information onto a 4 byte-wide bus 49. Master data circuit 37 includes circuit elements such as 64-bit latch 40, multiplexer 42, and first and second buffers, respectively 44 and 46. Buffers 44 and 46 are opened in response to a Go signal along line 48 to provide a 32-bit output from multiplexer 42 to data bus 49, and to produce a BusClk signal on line 47. Multiplexer 42 inherently produces a delay in the data applied to data bus 49, which is desired to enable effective operation depending upon the clock signal leading data by a predetermined hold time. These circuit elements of master data circuit 37 are arranged in a master data path between a source of information and data bus 49. In FIG. 2, a 64-bit data line is presented to latch 40 on each Clock cycle, such that clocking is applied to 2-1 multiplexer 42 to provide a 32-bit half of the 64-bit data line on each half clock period of the Clock. Further, as used herein, the term "line" refers to a unit of data transferred in two half cycles or a period of the source's data clock (e.g., a 64-bit line).

Figure 3:
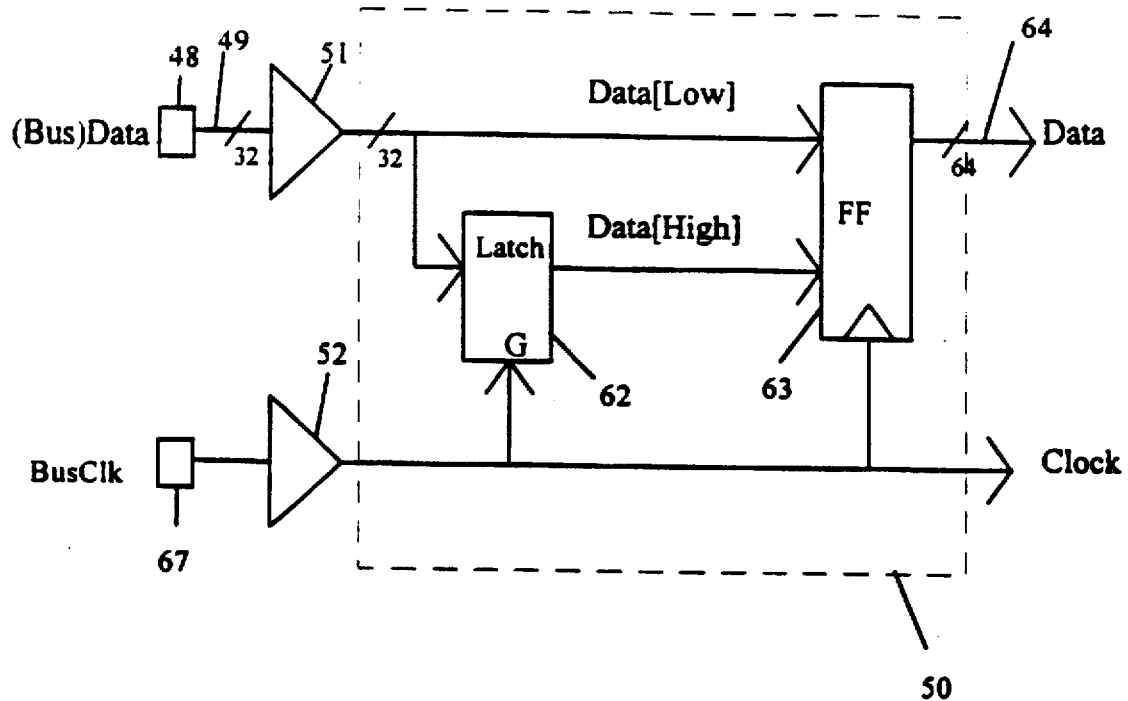
FIG. 3 shows a slave data circuit diagram according to the present invention for adapting an input of reduced data bit width into a standard sized data bandwidth with selected circuit elements arranged in a slave data path.

FIG. 3 shows a circuit diagram for a slave data circuit 50 effective for adapting an input reduced data packet 32-bits wide, for example, into a larger data packet width of 64-bits.

The input data is for example provided on data bus 49 in packets having a minimum size of eight bytes per line and at a minimum data rate of fifty megahertz. The data adaptation is accomplished to convert from 32 to 64 bits, for example, with circuit elements including a bus data buffer 51, a bus clock buffer 52, and first and second data latches 62 and 63. Latch 63 acts as a line register, and these circuit elements are arranged in partially cascaded fashion in a slave data path from data bus 49.

Slave data circuit 50 in FIG. 3 is particularly effective to concatenate two 32-bit wide data sections into a single 64-bit wide data line. First data latch 62 is open during the first half period of the bus clock (BusClk) and closes at the falling or trailing edge of BusClk at which time the second half-period starts, thereby retaining the first 32 bit section of the input data packet received on data bus 49. At the rising or leading edge of BusClk, which is at the end of the second half cycle, the half-cycle 32 bits on data bus 49 are concatenated with the stored first half-cycle data at first data latch 62 to form a full 64-bit line at output line 64 of second data latch 63. The 64-bit output line 64 is latched to second data latch 63, when the clock pulse "Clock" produces a rising edge at the end of a full clock period. The Clock pulse is derived from BusClk through buffer 52.

Figure 4:
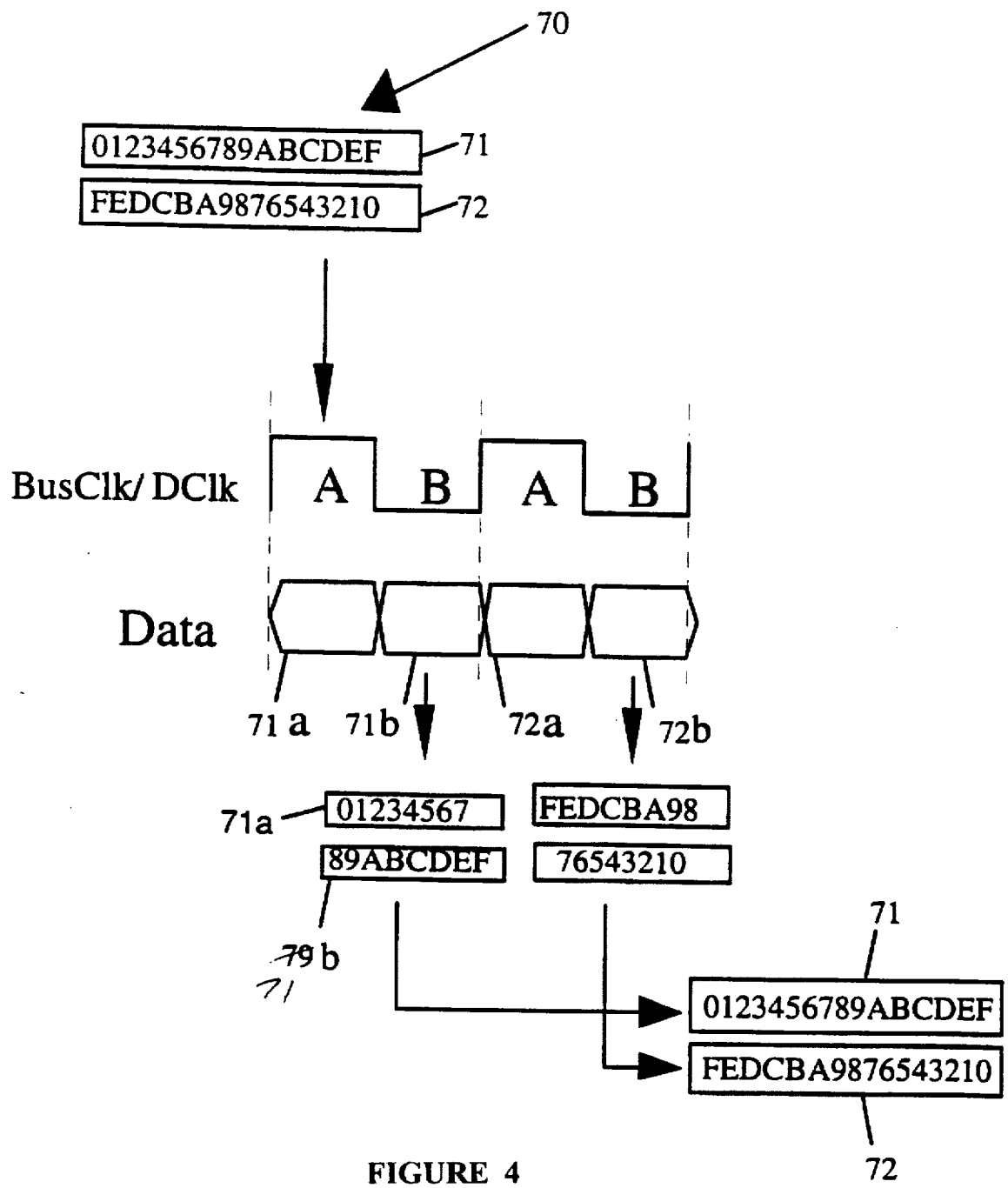
FIG. 4 shows a diagram indicating the clocking and transmission of data from a source to a destination in accordance with the present invention.

FIG. 4 shows a diagram indicating the clocking and transmission of data from a source to a destination in accordance with the invention herein. According to FIG. 4, source side data packet 70 is decomposed into first and second portions, respectively 71 and 72. The entire data packet including two lines is transmitted in two clock cycles, and the first portion of packet 70 is further decomposed into subpackets 71a and 71b, while the second portion of packet 70 is further decomposed into subpackets 72a and 72b. Subpackets 71a and 72a are transmitted during the respective high portions of successive clock cycles (i.e., clock cycles A), while subpackets 71b and 72b are transmitted during the low portions of successive clock cycles (i.e., clock cycles B). Transmission with master circuit 37 is accomplished with multiplexer 42 receiving high clock and low clock data from latch, i.e., flip-flop, 40, as the clock alternates between high and low clock output states. Thus, on bus 49 the high source data will precede the low source data, assuming operation begins with clock high.

Figure 5A:
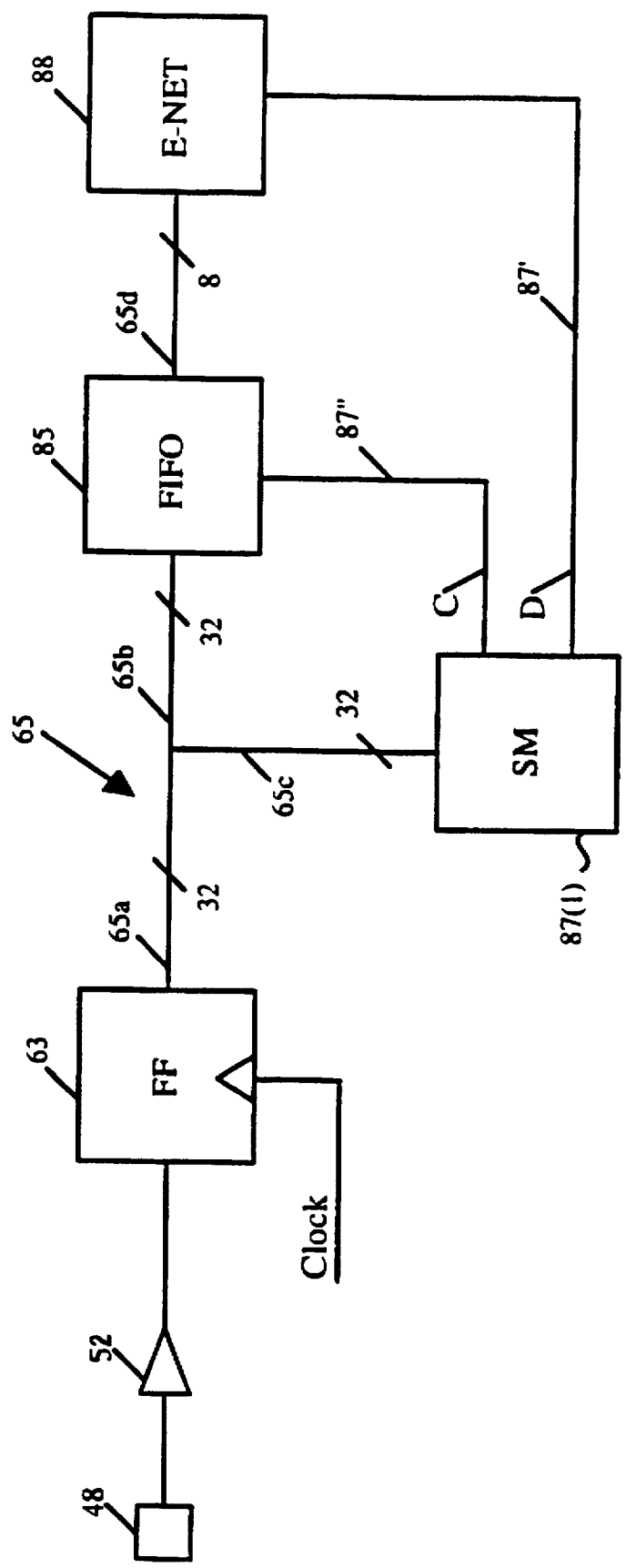
FIG. 5a shows a diagram of one version of the receiving or slave circuitry of the present invention, in which a receiving flip flop provides four bytes per time interval to a FIFO register which then produces the received information to a connected device or system, such as in this case, an 8-bit wide Ethernet network.

FIG. 5a shows a diagram of one version of the receiving or slave circuitry of the present invention, in which a receiving flip flop 63 provides four bytes per time interval to a FIFO register 85 which then produces the received information to a connected device or system, such as in this case, an 8-bit wide Ethernet network 88. In particular, according to one embodiment, 32 bits of information can be received in parallel from bus 49 and through bus pad 48 and buffer 52 by flip flop 63. Flip flop 63 has a clock input from the bus clock, which is alternatively designated DClk or BusClk. The output connection from flip flop 63 to FIFO 85 and state machine 87 is line 65 which is branched and includes sublines 65a–65c respectively connected to flip flop 63, FIFO 85, and state machine 87(1). Ethernet network 88 is connected to FIFO 85 along line 65d, and both FIFO 85 and Ethernet network 88 are subject to control signals from state machine $87^{(1)}$, along respective control lines 87' and 87".

State machine 87(1) of FIG. 5a operates in accordance with well-known finite state machine principles as for example expressed below in connection with FIG. 9 receives an input address signal during state 1, in this case from bus line 65c. During subsequent respective states activation signals and information will be provided by state machine 87(1) on respective output lines 87' and 87" to provide "on"

indications to FIFO 85 and Ethernet 88, to enable the data to be applied to FIFO 85 and Ethernet 88.

Figure 5B:
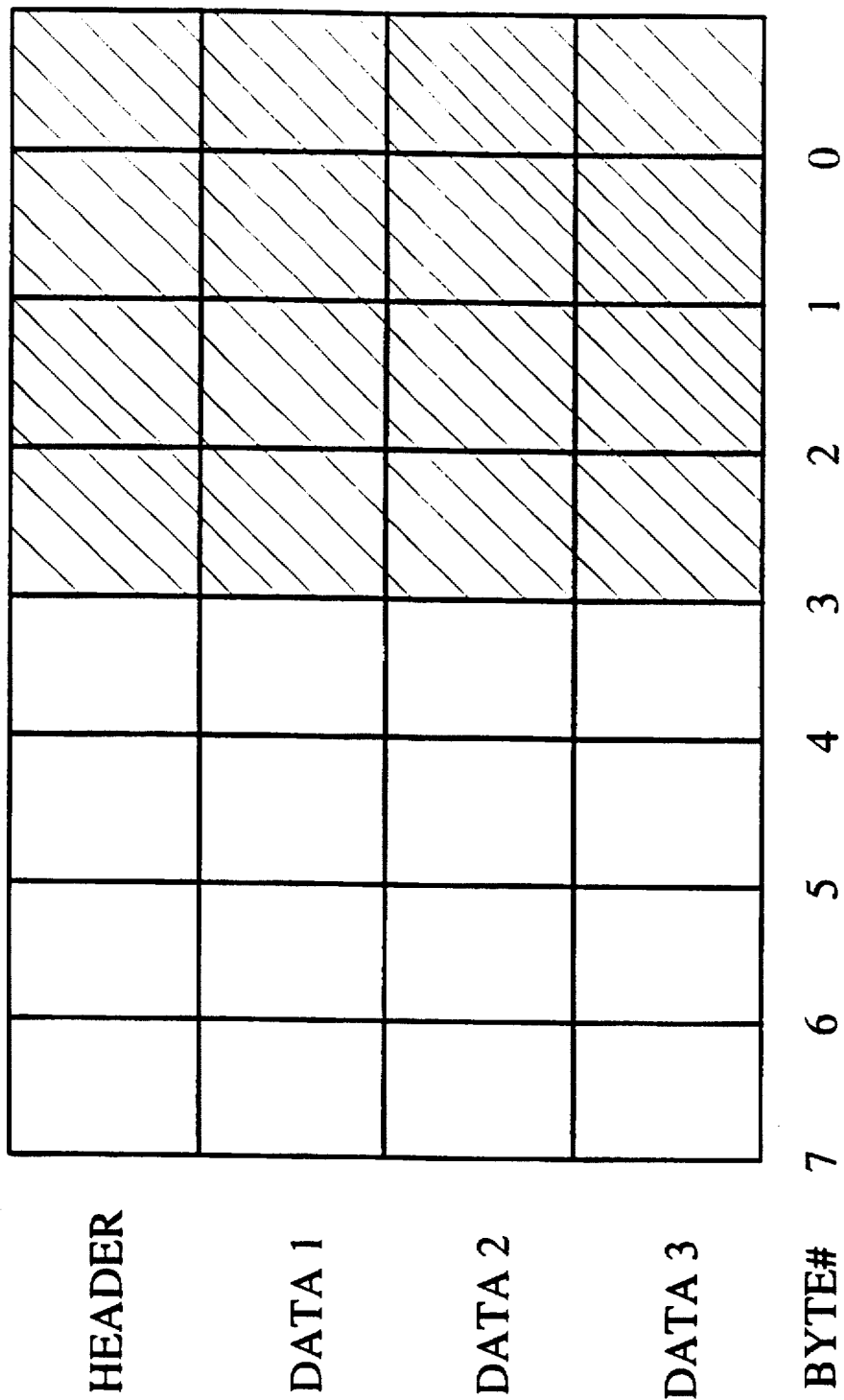

FIG. 5b shows a chart of the data portions actually captured by the receiving circuitry shown in FIG. 5a. The chart in its entirety represents the data pack transmitted. As shown, four lines of information have been transmitted containing an eight byte header line and three data lines. The slave/receiver circuit of FIG. 5a permits receipt of the last half of the header line which includes address information and other key data items needed by state machine 87(1). Additionally, Ethernet network 88 receives the last half of the first data line of information through FIFO 85. The first halves of header and data line are lost, because line 65 is only 32 bits wide versus the 64 bit width received through buffer 52. The effect of FIFO 85 is to ensure that Ethernet network 88 does receive a full 32 bits of information at least as to the last half of one data line transmitted from the source, even though the Ethernet networks 88 itself supports only eight bits in parallel. This is accomplished by state machine 87(1) cycling data out of FIFO 85 one byte at a time during the process DATA state of state machine 87(1). By repeating the indicated operating steps, successive lines of header information and data (e.g., DATA1 ... DATA3) can be latched and processed.

Figure 6A:
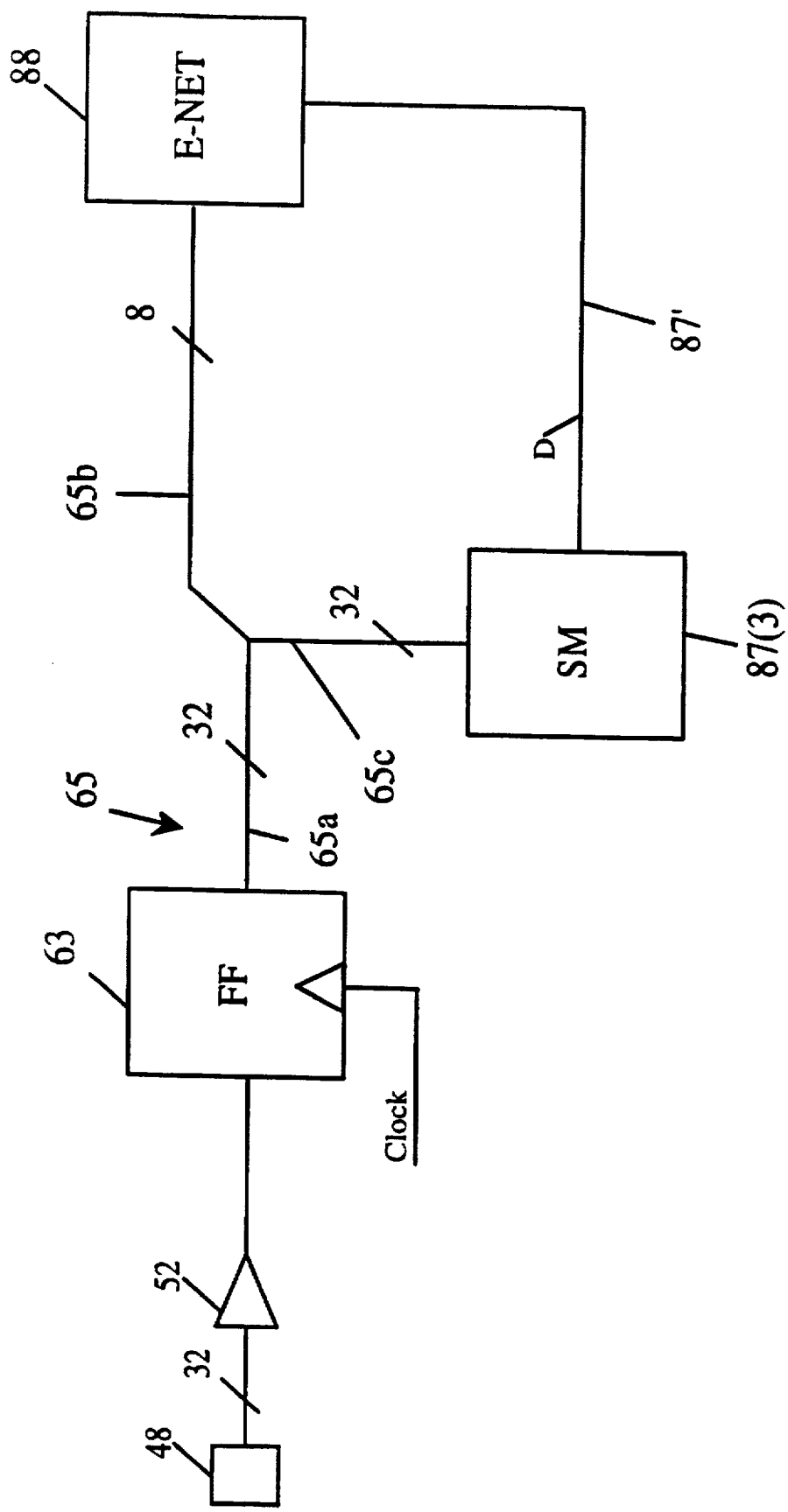
FIG. 6a shows a diagram of one version of the receiving or slave circuitry of the present invention, in which a receiving flip flop provides information to a connected device or system, such as in this case, an 8-bit wide Ethernet network.

FIG. 6a shows a diagram of one version of the receiving or slave circuitry of the present invention, in which a receiving flip flop 63 provides four bytes per time interval to a connected device or system, such as in this case, an 8-bit wide Ethernet network. In particular, according to one embodiment, 32 bits of information can be received in parallel from bus 49 and through bus pad 48 and buffer 52 by flip flop 63. Flip flop 63 has a clock input from the bus clock. The output connection from flip flop 63 to Ethernet network 88 and state machine 87(3) is line 65 which is branched and includes sublines 65a-65c respectively connected to flip flop 63, Ethernet network 88, and state machine 87(3). Ethernet network 88 is subject to control from state machine 87(3), along control line 87'.

The state machine 87(3) of FIG. 6a operates in accordance with well-known finite state machine principles to insure that when it receives an input signal it exercises control of Ethernet 88 along control line 87'. As noted with respect to FIG. 9, the operation of state machine 87(3) is governed in operation by successive idle states followed by a data processing step according to which the output of flip flop 63 is applied to Ethernet network 88.

Figure 6B:
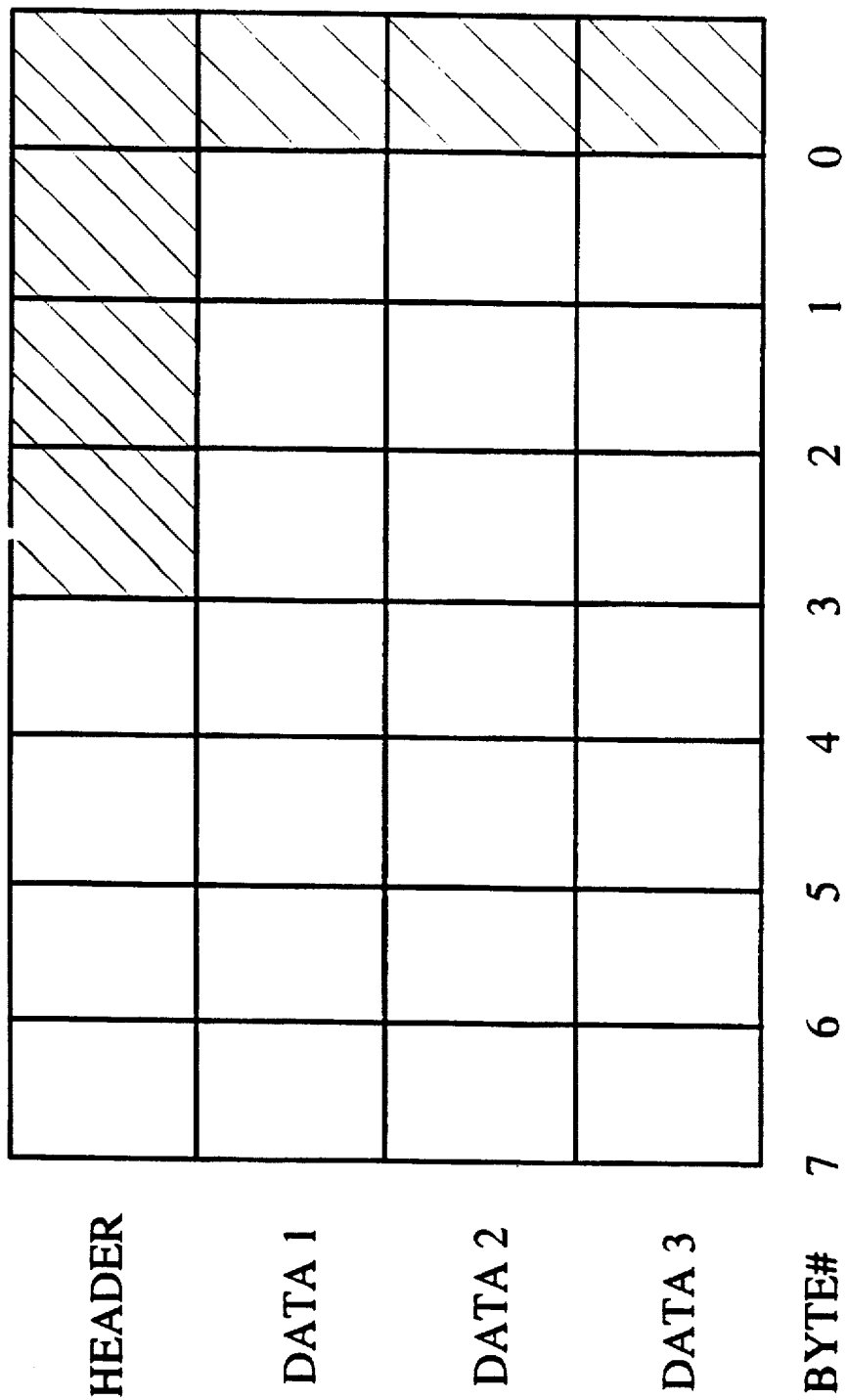

FIG. 6b shows a chart of the data portions actually captured by receiving devices shown in FIG. 6a. The chart represents the data pack transmitted, including four lines of information having an eight byte header line and three data lines. The slave/receiver circuit of FIG. 7a permits receipt of the last half of the header line which includes address information and other key data items needed by state machine 87(3). Additionally, Ethernet network 88 receives a single byte from the last half of each line of information from flip flop 63. The first halves of header and data line are lost, as are three other of the bytes from the last halves of the same data lines, because line 65b is only 8 bits wide compared with the 64 bit width received through buffer 52 and 32 bits received through flip flop 63.

Figure 7A:
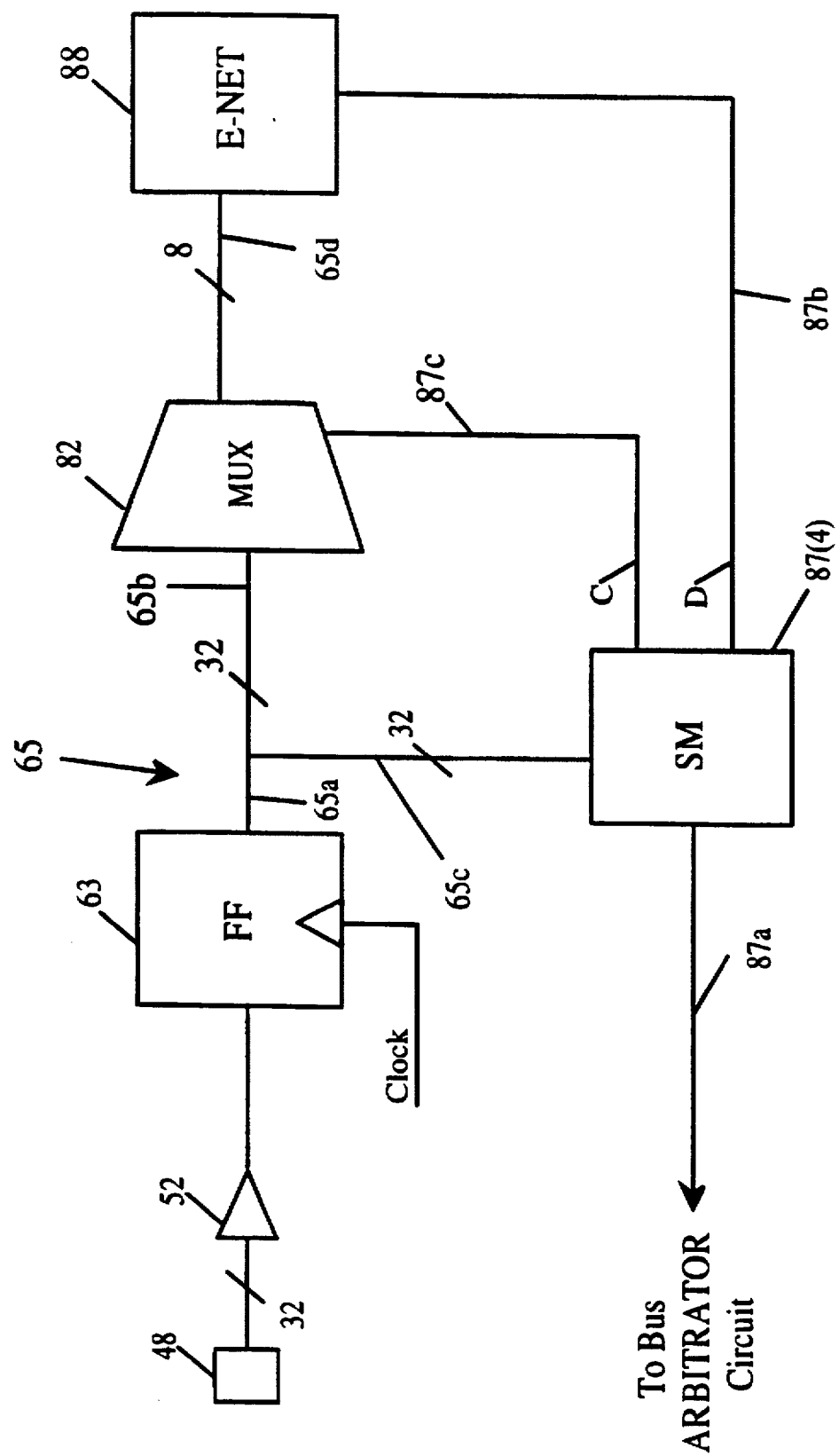
FIG. 7a shows a diagram of one version of the receiving or slave circuitry of the present invention, in which a receiving flip flop provides information to a multiplexer and a state machine.

FIG. 7a shows a diagram of one version of the receiving circuitry or slave circuitry of the present invention, in which a receiving flip flop 63, respectively provides four bytes per time interval of received information to (1) a multiplexer 82 which then produces the received information in byte-sized portions to a connected device or system, such as an 8-bit wide Ethernet network, and to (2) a state machine 87(4) effective for controlling the production of output bytes from multiplexer 82 and for sending busy signals to bus arbitration circuitry, in order to avoid data overload conditions in flip flop 63 and multiplexer 82. In particular, according to one embodiment, 32-bits of information can be received in parallel from bus 49 and through bus pad 48 and buffer 52 by flip flop 63. Flip flop 63 has a clock input from the bus clock, which is alternatively designated DClk or BusClk. The output connection from flip flop 63 to multiplexer 82 and state machine 87(4) is line 65. Line 65 includes sublines 65a-65c respectively connected to flip flop 63, multiplexer 82, and state machine 87(4). Ethernet network 88 is connected to multiplexer 82 along line 65d, and both multiplexer 82 and Ethernet network 88 are subject to control signals from state machine 87(4), along respective control lines 87b through and 87c. Additionally, state machine 87(4) is effective for sending busy signals to bus arbitration circuitry not shown herein but shown in a separate patent document expressly referred to herein which is expressly incorporated into the instant document. The effect of sending the busy signals is to obtain additional time to enable the effective processing of information already received by flip flop 63.

The state machine 87(4) receives an input 32 bits wide including address information along input line 65c and issues output control signals along the control lines 87c and 8b as well as on line 87a to a bus arbitrator circuit which is not shown. The state machine principles set forth in connection with FIG. 9 apply, particularly with respect to the data processing steps, under which data is output from MUX 82 in byte-sized increments for passage to Ethernet network 88 along line 65d.

Figure 7B:
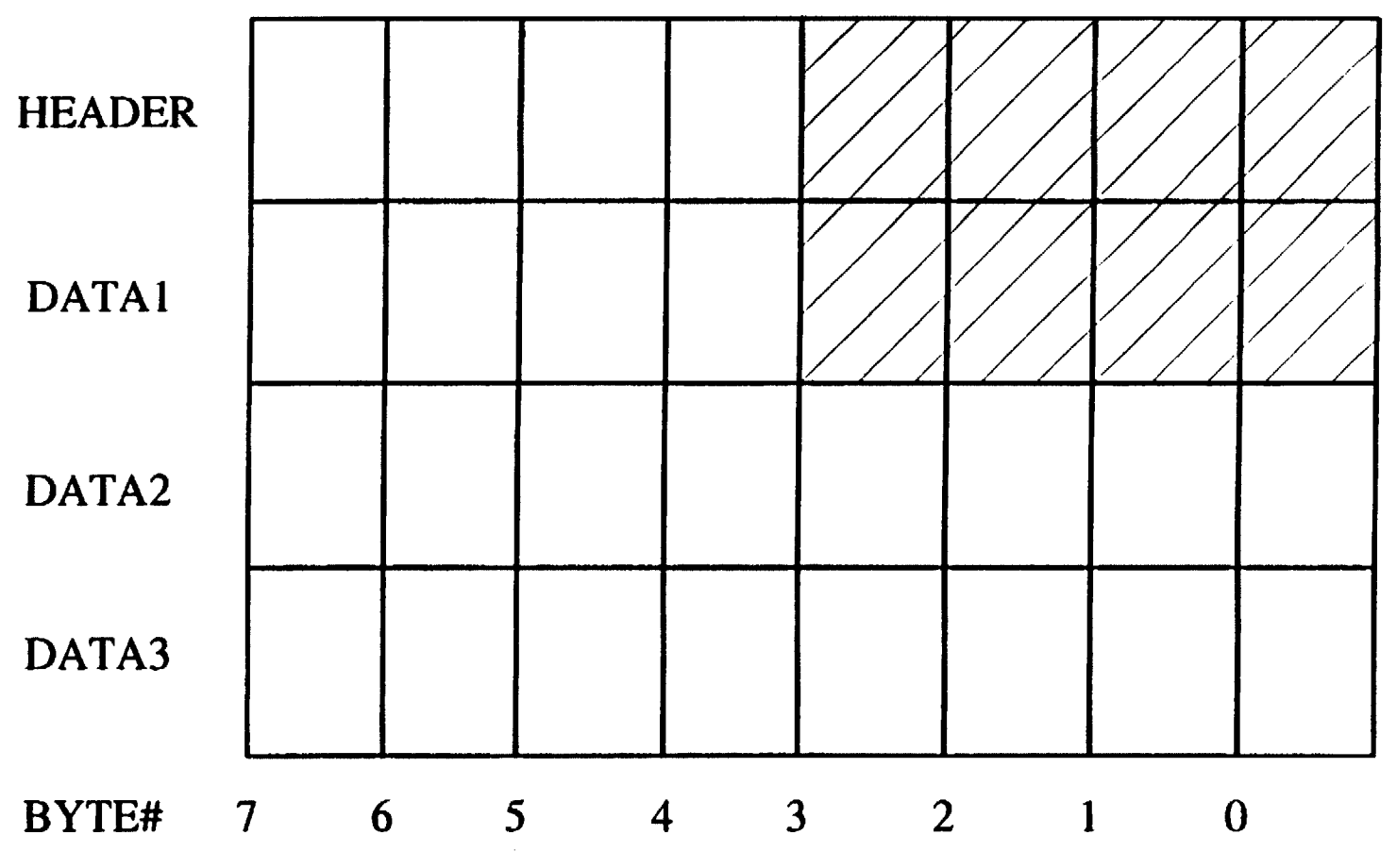

FIG. 7b shows a chart of the data portions actually captured by receiving devices shown in FIG. 7a. The chart in FIG. 7b represents the data pack transmitted in its entirety. As shown, four lines of information have been transmitted containing an eight byte header line and three data lines. The slave/receiver circuit of FIG. 8a permits receipt of the last half of the header line which includes address information and other key data items needed by state machine 87[(4)] Additionally, Ethernet network 88 will receive the last half of the first data line of information through multiplexer 82. The first halves of header and data line are lost, because line 65 is only 32 bits wide compared with the 64 bit width received through buffer 52 and flip flop 63. The effect of multiplexer 82 is to ensure that Ethernet network 88 does receive a full 32 bits of information at least as to the last half of one data line transmitted from the source.

Figure 8A:
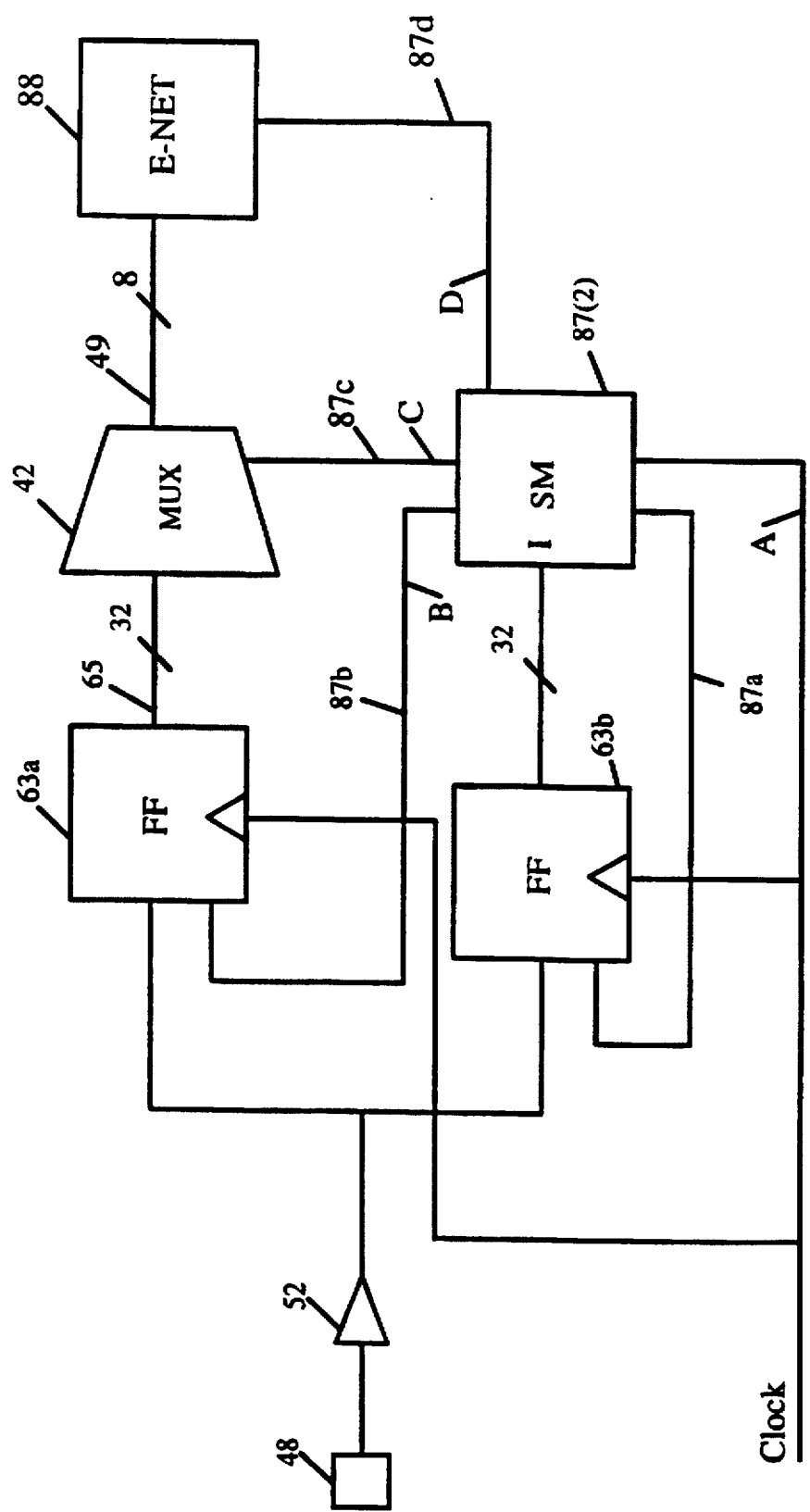
FIG. 8a shows a diagram of one version of the receiving or slave circuitry of the present invention, in which a pair of receiving flip flops provide information to a multiplexer which then supplies the received information to a connected device or system, such as an Ethernet network, under control of a state machine.

FIG. 8a shows a diagram of one version of the receiving or slave circuitry of the present invention, in which a pair of receiving flip flops, respectively 63a and 63b, are provided with information. Flip flop 63a provides four bytes per time interval of received information to a multiplexer 42. The multiplexer then produces the received information in byte-sized portions to a connected device or system, such as an 8-bit wide Ethernet network. Further, flip flop 63b provides four bytes per time interval to a state machine 87(2) effective for controlling the enablement of respective flip flops 63a and 63b and for controlling the production of output bytes from multiplexer 42. The information to the second of the flip flops, i.e., flip flop 63b, is address or header information required by the state machine 87(2) to control the indicated operations. In particular, according to one embodiment, 64-bits of information can be received in two 32-bit groups from bus 49 and through bus pad 48 and buffer 52 by flip flop 63. Flip flop 63 has a clock input from the bus clock.

The output connection from flip flop 63a to multiplexer 42 is line 65. Ethernet network 88 is connected to multiplexer 42 along line 49, and both first and second flip flops 63a and 63b, as well as multiplexer 42 and Ethernet network 88 are subject to control signals from state machine 87(2), along respective control lines 87a through and 87d.

State machine 87(2) of FIG. 8a operates as before with reference to FIG. 5a according to a well-known finite state machine principles. An example of the basic operation of such a state machine is given in FIG. 9 and the accompanying text. For example, in the case of FIG. 8a, state machine 87(2) receives a 32 bit input from flip flop 63b. This follows a destination select signal to state machine 87(2) providing notice that a packet of information is due to arrive. At the arrival of a clock input, state machine 87(2) produces control outputs 87a, 87b, 87c, and 87d respectively to latch address information on the output of flip flop 63b, to latch data onto MUX 42, and to process data by providing it in successive bytes from MUX 42 to Ethernet network 88.

Figure 8B:
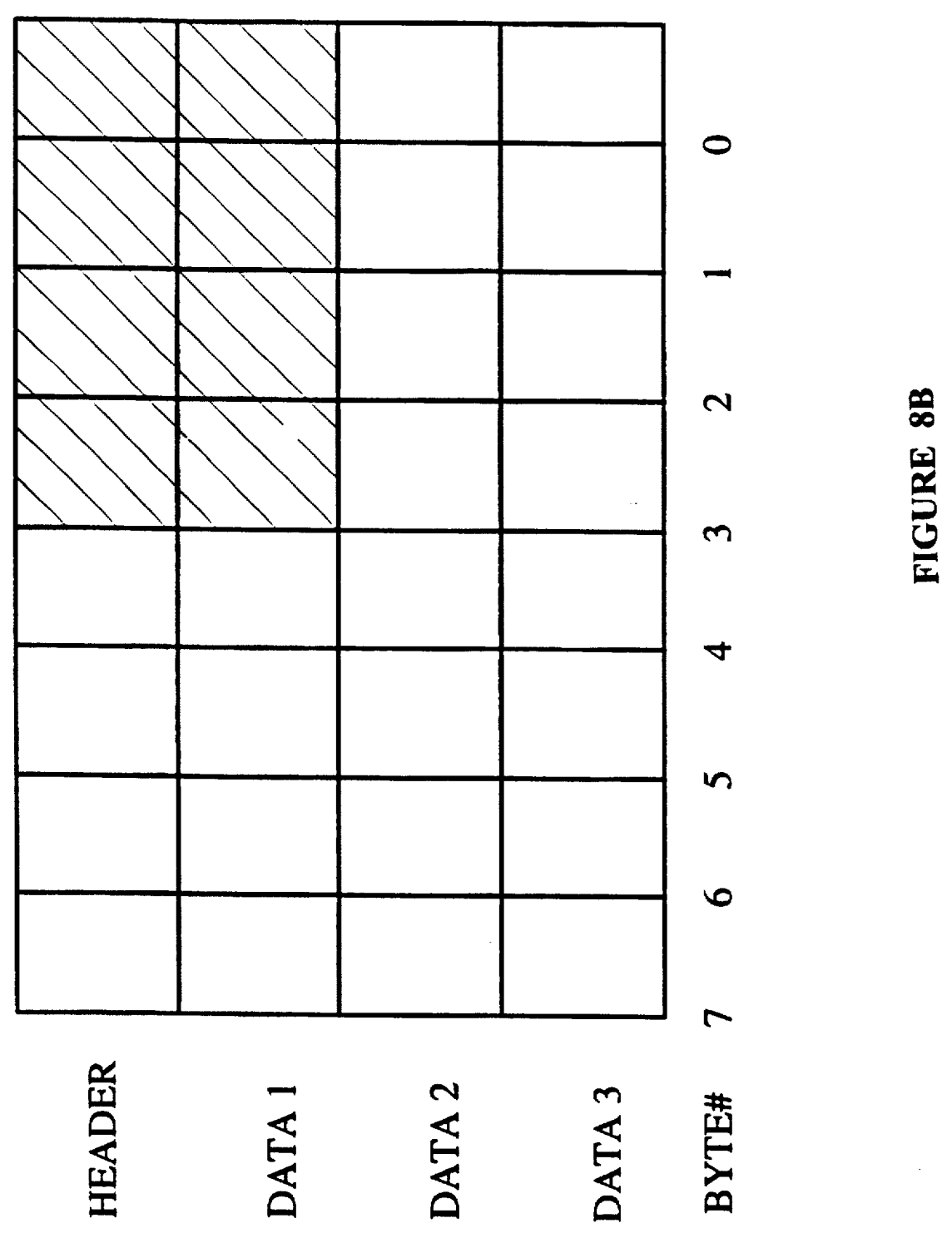

FIG. 8b shows a chart of the data portions actually captured by receiving devices shown in FIG. 8a. The chart represents the data pack transmitted and indicates in the shaded regions which of the data pack items are actually received. Four lines of information are shown to have been transmitted. These four lines include an eight byte header line and three data lines. The slave/receiver circuit of FIG. 8a will permit receipt of the last half of the header line which includes address information and other key data items needed by state machine 87(2). Additionally, Ethernet network 88 will receive the last half of the first data line of information through multiplexer 42. The first halves of header and data line are lost, because line 65 is only 32 bits wide vice the 64 bit width received through buffer 52 and flip flop 63. The effect of multiplexer 42 is to ensure that Ethernet network 88 does receive a full 32 bits of information at least as to the last half of one data line transmitted from the source, even though the Ethernet networks 88 itself supports only eight bits in parallel.

Figure 9:
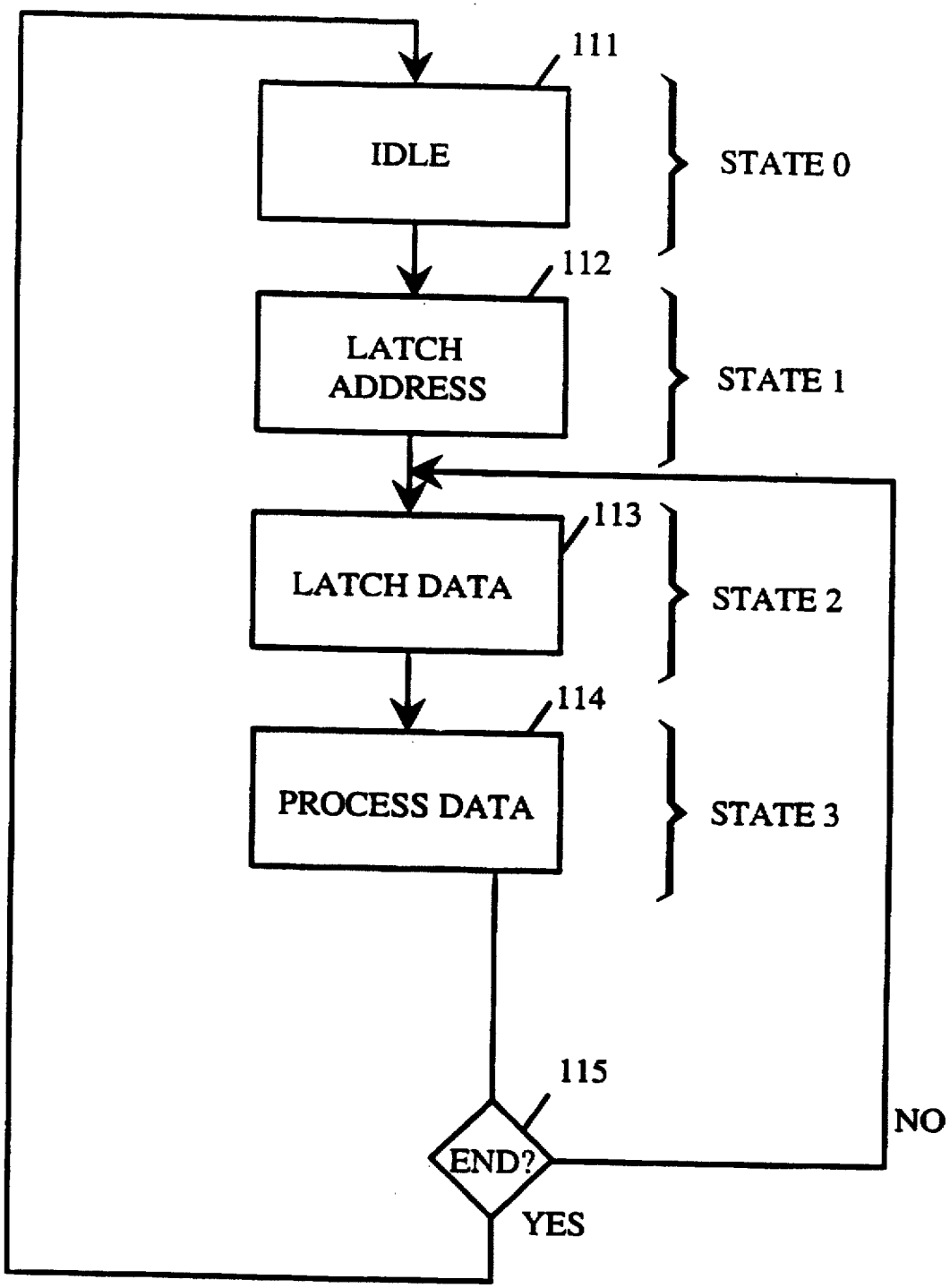

FIG. 9 shows the basic operational states and flow of operation of the state machines of FIGS. 5a, 6a, 7a and 8a. The first state, i.e. state "0", is an IDLE state during which the outputs of the particular state machine do not prompt initiation of action by any of the attached components or devices linked by control lines to the state machines. The IDLE state is expressed at block 111 of the flow chart of FIG. 9. During this state, there are no activate signals provided from the state machine to any of nodes A-D (to the extent applicable).

The second state, i.e., state "1," is shown at box 112 in FIG. 9. The second state is the LATCH ADDRESS state in which a device activation or enable signal is applied to an applicable node to permit the applicable state machine to receive a destination address in a device of system to which receive data is being dispatched. The third state, i.e., state "2," is shown at box 113 in FIG. 9. The third state is the LATCH DATA state in which the state machine provides enable or activation signals to permit data being transmitted to be suitably latched onto a line or device according to a predetermined scheme. The fourth state, i.e., state "3," is shown at box 114 in FIG. 9. The fourth state is the PROCESS DATA step in which the data which has been latched is finally organized and dispatched to its final or ultimate destination at a location in an output system or device, such as an Ethernet network, for example. After completing the fourth state, operation of the particular state machine returns to its first or IDLE state as expressed at block 111 of FIG. 9, if an END process determination is made in accordance with the "End?" decision block 115 in FIG. 9. If there is no affirmative decision to end, control continues with a repeat of latch data step according to block 113 and process data according to block 113 and process data according to block 114, followed by redetermination of the END? decision in block 115.

In summary, a variety of methods and arrangements according to various versions of the invention have been detailed. These versions are directed toward the organization of information within information packets which are received by receiving circuits or master circuits for transmission on a common data bus. The invention is directed toward the system including receiving and sending circuitry dealing in various ways with information packets and sub-packets into which the information is organized according to prioritized schemes. In particular information in the information packets is organized so that certain devices which may be connected to the common bus through the slave circuitry are able to operate on the basis of essential or prioritized information and data which includes essential information but subsets to a lower priority level information which cannot be utilized by effectively received by a slower or more limited or narrower bit width devices which may be connected to the slave circuitry to the common bus. The master circuits and slave circuits within the scope of the invention include a variety of flip flop subcircuits and multiplexing subcircuits and state machines effective for controlling output data systems including Ethernet systems.

What is claimed is:

1. In a bus communications system, for transmission of an information packet having a first predetermined bit width, the bus communication system including a sending circuit and a receiving circuit connected by a data bus having a second predetermined bit width, the second predetermined bit width less than the first predetermined bit width, a method of communication comprising the steps of:

ordering plurality of bits of the information packet to place information of greater significance in a second portion and to place information of lesser significance in a first portion;

producing sequential clock signals for the sending circuit, each clock signal having a rising edge and a falling edge;

receiving the information packet at the sending circuit;

breaking the information packet into the first portion, having a first portion bit width and the second portion, having a second portion bit width, the first portion bit width substantially equivalent to the second portion bit width;

transmitting across the data bus the first portion on the rising edge of the clock signal and the second portion on the falling edge of the clock signal;

receiving at the receiving circuit the first portion and the second portion from the data bus; and concatenating the first portion and the second portion to produce the information packet at the data line.

2. A bus communication system, including a clock to generate clock signals, each clock signal having a rising edge and a falling edge, for transmitting an information packet, having a first predetermined bit width, on a data bus, having a second predetermined bit width, the second predetermined bit width less than the first predetermined bit width, the bus communication system comprising:

a source for ordering the information packet to place information of greater significance in a second portion of the information packet and information of lesser significance in a first portion of the information packet;

a sending circuit coupled to the source, the sending circuit including a latch and a multiplexer for breaking the information packet into the first portion, having a first portion bit width, and the second portion, having a second portion bit width, the first portion bit width plus the second portion bit width substantially equivalent to the first predetermined bit width, the sending circuit for transmitting to the data bus the first portion on the rising edge of the clock and the second portion on the falling edge of the clock signal; and a receiving circuit, including a first latch for receiving the first portion from the data bus and a second latch for receiving the second portion from the data bus and for concatenating the first portion and the second portion to output the information packet.

3. The sending circuit in claim 2, further comprising a buffer control circuit, having a control line and trigger device, and wherein the output buffer and the clock buffer are controlled by the buffer control circuit to facilitate synchronized clocking at the rising edge and the falling edge of the clock signal.

* * * * *